US011327582B2

(12) United States Patent
Kim et al.

(10) Patent No.: US 11,327,582 B2
(45) Date of Patent: May 10, 2022

(54) STYLUS PEN, TOUCH APPARATUS, AND TOUCH SYSTEM

(71) Applicant: HiDeep Inc., Seongnam-si (KR)

(72) Inventors: Seyeob Kim, Seongnam-si (KR); Hyoungwook Woo, Seongnam-si (KR); Kyeonghan Park, Seongnam-si (KR); Bonkee Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 16/986,461

(22) Filed: Aug. 6, 2020

(65) Prior Publication Data

US 2021/0089147 A1 Mar. 25, 2021

(30) Foreign Application Priority Data

Sep. 20, 2019 (KR) ........................ 10-2019-0116217

(51) Int. Cl.
*G06F 3/044* (2006.01)
*G06F 3/0354* (2013.01)
*G06F 3/041* (2006.01)

(52) U.S. Cl.
CPC ........ *G06F 3/03546* (2013.01); *G06F 3/0441* (2019.05); *G06F 3/0445* (2019.05); *G06F 3/04182* (2019.05)

(58) Field of Classification Search
CPC .......... G06F 3/033; G06F 3/017; G06F 3/011; G06F 3/0482; G06F 3/0488; G06F 3/0346; G06F 3/016; G06F 3/013; G06F 3/0338; G06F 3/038; G06F 3/044; G06F 3/041
See application file for complete search history.

(56) References Cited

U.S. PATENT DOCUMENTS

| 5,608,390 | A | * | 3/1997 | Gasparik | G06F 3/03545 |
| | | | | | 178/20.02 |
| 5,854,881 | A | * | 12/1998 | Yoshida | G06F 3/0412 |
| | | | | | 345/104 |
| 6,744,426 | B1 | * | 6/2004 | Okamoto | G06F 3/03545 |
| | | | | | 178/18.07 |
| 10,698,524 | B2 | * | 6/2020 | Park | G06F 3/0442 |
| 10,949,035 | B2 | * | 3/2021 | Hara | G06F 3/03545 |

(Continued)

FOREIGN PATENT DOCUMENTS

| JP | 2000-099260 | 4/2000 |
| KR | 10-2014-0094232 | 7/2014 |

(Continued)

OTHER PUBLICATIONS

KIPO, PCT Search Report & Written Opinion of PCT/KR2020/010404 dated Nov. 3, 2020.

*Primary Examiner* — Olga V Merkoulova
(74) *Attorney, Agent, or Firm* — Lex IP Meister, PLLC

(57) ABSTRACT

An exemplary embodiment of the present invention provides a stylus pen including: a body portion; a conductive tip configured to be exposed from an inside of the body portion to an outside thereof; a ground portion configured to be electrically connected to a user; and a resonant circuit portion in the body portion, electrically connected between the conductive tip and the ground portion, and including one or more resonance circuits that resonate with electrical signals of different frequencies transferred from the conductive tip to output resonance signals of different frequencies.

15 Claims, 14 Drawing Sheets

(56) References Cited

U.S. PATENT DOCUMENTS

| | | | | |
|---|---|---|---|---|
| 2004/0201580 A1* | 10/2004 | Fujiwara | G06F 3/0433 | 345/179 |
| 2005/0174259 A1* | 8/2005 | Ely | G06F 3/046 | 341/5 |
| 2005/0189154 A1* | 9/2005 | Perski | G06F 3/0442 | 178/18.06 |
| 2007/0085836 A1* | 4/2007 | Ely | G06F 3/046 | 345/173 |
| 2007/0188480 A1* | 8/2007 | Teng | G06F 3/03545 | 345/179 |
| 2008/0099254 A1* | 5/2008 | Katsurahira | G06F 3/046 | 178/18.01 |
| 2008/0106520 A1* | 5/2008 | Free | G06F 3/03545 | 345/173 |
| 2008/0149402 A1* | 6/2008 | Vos | G08C 21/00 | 178/19.01 |
| 2008/0238885 A1* | 10/2008 | Zachut | G06F 3/046 | 345/174 |
| 2010/0155153 A1* | 6/2010 | Zachut | G06F 3/041661 | 178/18.03 |
| 2010/0321338 A1* | 12/2010 | Ely | G06F 3/046 | 345/174 |
| 2011/0090146 A1* | 4/2011 | Katsurahira | G06F 3/0383 | 345/156 |
| 2011/0155479 A1* | 6/2011 | Oda | G06F 3/044 | 178/18.06 |
| 2014/0104224 A1* | 4/2014 | Ih | G06F 3/03545 | 345/174 |
| 2014/0132529 A1* | 5/2014 | Jeong | G06F 3/03545 | 345/173 |
| 2015/0049052 A1* | 2/2015 | Atkinson | G06F 1/1626 | 345/174 |
| 2017/0131829 A1* | 5/2017 | Takahashi | G06F 3/04184 | 178/18.06 |
| 2019/0155409 A1 | 5/2019 | Lee | | |

FOREIGN PATENT DOCUMENTS

| | | |
|---|---|---|
| KR | 10-2015-0135848 | 12/2015 |
| KR | 10-2016-0025443 | 3/2016 |

* cited by examiner

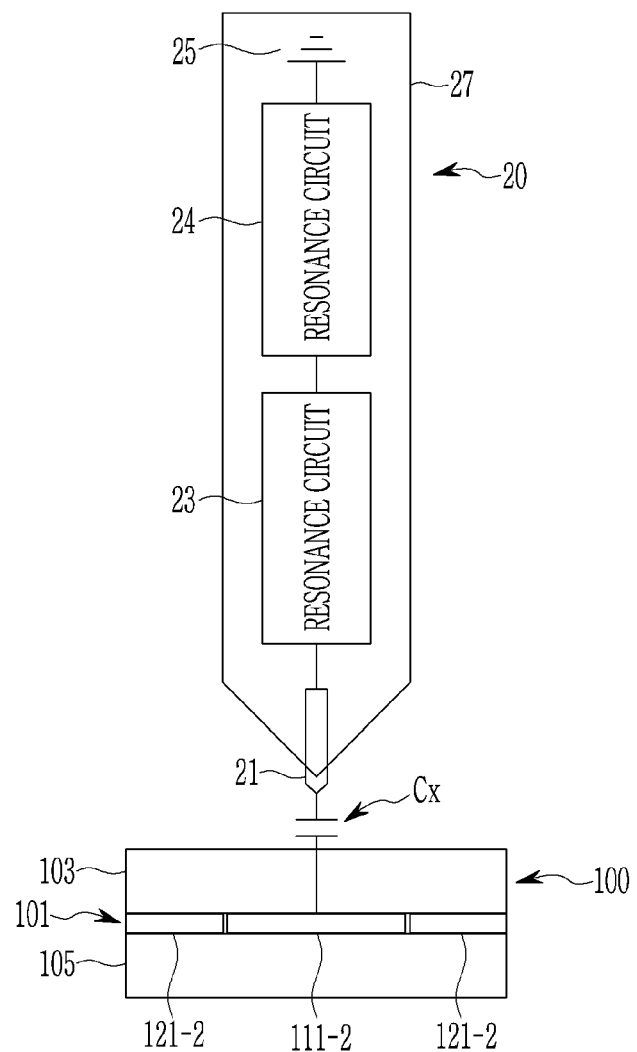

STYLUS PEN, TOUCH APPARATUS, AND TOUCH SYSTEM

CROSS-REFERENCE TO RELATED APPLICATION

This application claims priority to and benefits of Korean Patent Application No. 10-2019-0116217, filed in the Korean Intellectual Property Office on Sep. 20, 2019, the entire contents of which are incorporated herein by reference.

BACKGROUND

1. Field

The present disclosure relates to a stylus pen, a touch apparatus, and a touch system.

2. Description of the Related Art

Various terminals such as mobile phones, smart phones, tablet PCs, laptop computers, digital broadcasting terminals, PDAs (personal digital assistants), PMPs (portable multimedia players), and navigation devices include touch sensors.

In such a terminal, a touch sensor may be disposed on a display panel displaying an image, or may be disposed in an area of a terminal body. As a user interacts with the terminal by touching the touch sensor, the terminal may provide the user with an intuitive user interface.

The user may use a stylus pen for sophisticated touch input. The stylus pen may transmit and receive signals to and from the touch sensor in an electrical and/or magnetic manner.

The conventional touch sensor is vulnerable to noise having a frequency similar to a resonant frequency according to a design of a resonance circuit embedded in the stylus pen.

The above information disclosed in this Background section is only for enhancement of understanding of the background of the described technology, and therefore it may contain information that does not form the prior art that is already known in this country to a person of ordinary skill in the art.

SUMMARY

Exemplary embodiments have been made in an effort to provide a stylus pen having a plurality of resonant frequencies, and a touch apparatus and system for receiving a signal with reduced noise using the same.

For achieving the objects or other objects, an exemplary embodiment of the present invention provides a stylus pen including: a body portion; a conductive tip configured to be exposed from an inside of the body portion to an outside thereof; and a ground portion configured to be electrically connected to a user; and a resonant circuit portion positioned in the body portion, electrically connected between the conductive tip and the ground portion, and including one or more resonance circuits that resonate with electrical signals of different frequencies transferred from the conductive tip to output resonance signals of different frequencies.

The resonance circuit portion may include a first resonance circuit configured to resonate with an electrical signal of a first frequency and a second resonance circuit configured to resonate with an electrical signal of a second frequency, wherein the first resonance circuit may output the resonant signal through the conductive tip during a first period, and a second resonant circuit may output the resonance signal through the conductive tip during a second period that is different from the first period.

The first resonance circuit and the second resonance circuit may alternately output the resonance signal.

The first resonance circuit may include a first inductor connected between the conductive tip and the second resonance circuit and a first capacitor connected between the conductive tip and the second resonance circuit, the second resonance circuit may include a second inductor connected between the ground portion and the first resonance circuit and a second capacitor connected between the ground portion and the first resonance circuit, and the first inductor and the second inductor may have ferrite cores separated from each other.

The first resonance circuit may be connected between the conductive tip and the second resonance circuit, and the second resonance circuit may be connected between the first resonance circuit and the ground portion.

The resonance circuit portion may output a resonance signal having a frequency that changes with time in response to an electrical signal having a frequency that changes with time.

An exemplary embodiment of the present invention provides a touch apparatus including: a touch sensor configured to include first touch electrodes sensing a touch input in a first direction and second touch electrodes sensing a touch input in a second direction crossing the first direction; and a controller configured to determine whether a noise signal is received by sampling a signal transferred from at least one of the first touch electrodes and the second touch electrodes depending on a first sampling frequency associated with a first driving frequency during a first period within a touch report frame period, and when it is determined that the noise signal is received, to apply a second driving signal having a second driving frequency that is different from the first driving frequency to at least one of the first touch electrodes and the second touch electrodes during a second period after the first period.

The controller may receive a detection signal by sampling a signal transferred from at least one of the first touch electrodes and the second touch electrodes depending on a second sampling frequency associated with the second driving signal during a third period after the second period.

The signal transferred from at least one of the first touch electrodes and the second touch electrodes during the third period may be a signal resonated by the second driving signal.

The controller may determine whether a noise signal is received by sampling the signal transmitted from at least one of the first touch electrodes and the second touch electrodes depending on a second sampling frequency associated with the second driving frequency during a first period within a next touch report frame period after the third period ends.

The controller may apply a first driving signal having the first driving frequency to at least one of the first touch electrodes and the second touch electrodes during a second period after the first period when it is determined that the noise signal is not received.

The controller may receive a detection signal by sampling a signal transferred from at least one of the first touch electrodes and the second touch electrodes depending on the first sampling frequency during a third period after the second period.

An exemplary embodiment of the present invention provides a touch apparatus including: a touch sensor configured to include first touch electrodes sensing a touch input in a first direction and second touch electrodes sensing a touch input in a second direction crossing the first direction; and a controller configured to receive a first detection signal by applying a first driving signal having a first driving frequency during a first number of first periods to at least one of the first touch electrodes and the second touch electrodes and sampling a signal transferred from at least one of the first touch electrodes and the second touch electrodes depending on a first sampling frequency associated with the first driving frequency within one touch report frame period including a plurality of first periods, and to receive a second detection signal by applying a second driving signal having a second driving frequency different from the first driving frequency to at least one of the first touch electrodes and the second touch electrodes and sampling a signal transferred from at least one of the first touch electrodes and the second touch electrodes depending on a second sampling frequency associated with the second driving frequency during a first period of a second number.

The controller may determine whether a noise signal is received by using the first detection signal and the second detection signal, and when it is determined that the noise signal is received, may change a first number and a second number within a next touch report frame period.

The controller may increase the first number when a signal-to-noise ratio (SNR) of the first detection signal is greater than an SNR of the second detection signal, and may increase the second number when an SNR of the second detection signal is greater than an SNR of the first detection signal.

The first number and the second number may be the same.

The touch system according to an exemplary embodiment includes a stylus pen according to an exemplary embodiment, and a touch apparatus according to any one of exemplary embodiments.

According to the exemplary embodiments, it is possible to improve reception sensitivity of the touch input.

According to the exemplary embodiments, it is possible to accurately calculate touch positions.

BRIEF DESCRIPTION OF THE DRAWINGS

FIG. 5 illustrates a schematic view showing a stylus pen according to an exemplary embodiment.

DETAILED DESCRIPTION

Figure 1:
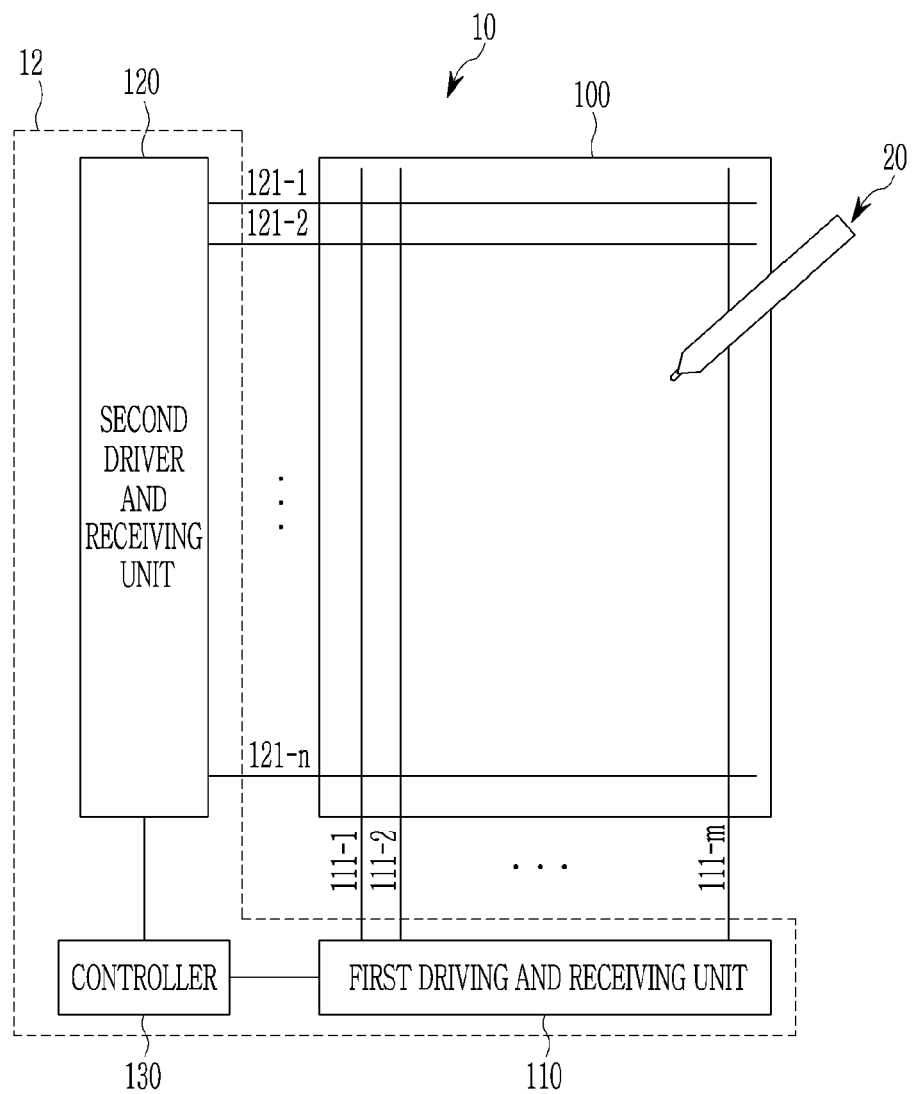
FIG. 1 schematically illustrates a touch apparatus according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Hereinafter, a touch apparatus and a control method thereof according to exemplary embodiments will be described with reference to necessary drawings.

Figure 2:
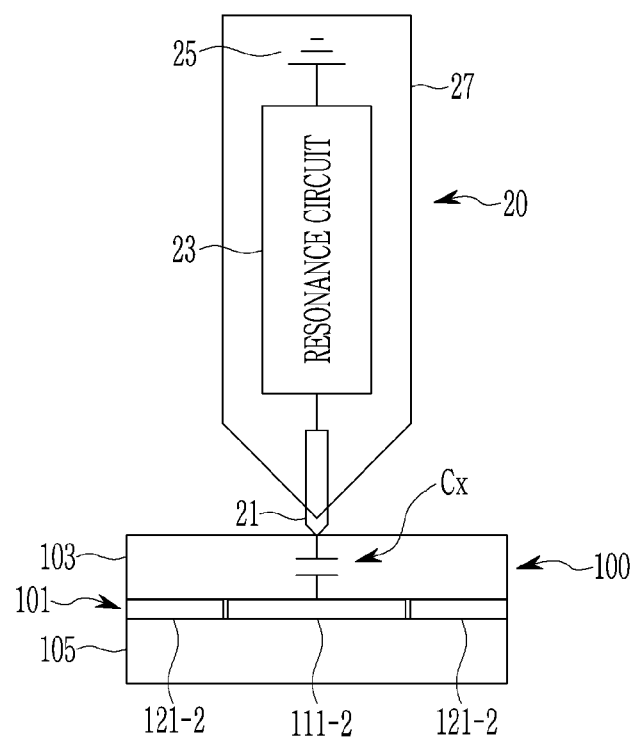
FIG. 2 illustrates an example in which a stylus pen is touched on a touch apparatus according to an exemplary embodiment.

FIG. 1 schematically illustrates a touch apparatus according to an exemplary embodiment, and FIG. 2 illustrates an example in which a stylus pen is touched on a touch apparatus according to an exemplary embodiment.

Referring to FIG. 1, the touch apparatus 10 according to an exemplary embodiment includes a touch panel 100 and a touch controller 12 for controlling the touch panel 100. The touch controller 12 may include first and second driving and receiving units 110 and 120, and a controller 130 for transmitting and receiving a signal to and from the touch panel 100.

The touch panel 100 includes touch electrodes sensing a touch input in a first direction and touch electrodes sensing a touch input in a second direction crossing the first direction. For example, the touch panel 100 includes a plurality of first touch electrodes 111-1 to 111-*m* having a form extending in a first direction, and a plurality of second touch electrodes 121-1 to 121-*n* having a form extending in a second direction crossing the first direction. In the touch panel 100, the first touch electrodes 111-1 to 111-*m* may be arranged along the second direction, and the second touch electrodes 121-1 to 121-*n* may be arranged along the first direction. In FIG. 1, a shape of the touch panel 100 is illustrated as a quadrangle, but the present invention is not limited thereto.

The touch apparatus 10 may be used to detect a touch input (direct touch or proximity touch) by a touch object. The touch input of the stylus pen 20 proximate to the touch panel 100 may be sensed by the touch apparatus 10.

As illustrated in FIG. 2, the touch panel 100 further includes an insulating layer 105 and a window 103. A touch electrode layer 101 may be disposed on the insulating layer 105. The touch electrode layer 101 includes a plurality of first touch electrodes 111-1 to 111-*m* and a plurality of second touch electrodes 121-1 to 121-*n*. A window 103 may be disposed on the touch electrode layer 101. In FIG. 2, the first touch electrodes 111-1 to 111-*m* and the second touch electrodes 121-1 to 121-*n* are illustrated to be disposed on a same layer, but may be on different layers, respectively, and the present invention is not limited thereto.

The first touch electrodes 111-1 to 111-*m* are connected to the first driving and receiving unit 110, and the second touch electrodes 121-1 to 121-*n* are connected to the second driving and receiving unit 120. In FIG. 1, the first driving and receiving unit 110 and the second driving and receiving unit 120 are separated from each other, but may be implemented as one module, unit, or chip, and the present invention is not limited thereto.

The first driving and receiving unit 110 may apply a driving signal to the first touch electrodes 111-1 to 111-*m*. In addition, the first driving and receiving unit 110 may receive a detection signal from the first touch electrodes 111-1 to 111-*m*. Similarly, the second driving and receiving unit 120 may apply a driving signal to the second touch electrodes 121-1 to 121-*n*. In addition, the second driving and receiving unit 120 may receive a detection signal from the first touch electrodes 121-1 to 121-*n*. That is, the first driving and receiving unit 110 and the second driving and receiving unit 120 may be a type of transceiver for transmitting and receiving signals, and each may include a driver and a receiver.

The driving signal may include a signal (e.g., a sine wave, a square wave, etc.) having a frequency corresponding to a resonant frequency of a stylus pen 20. The resonant frequency of the stylus pen 20 depends on a design value of a resonant circuit portion 23 of the stylus pen.

The stylus pen 20 may include a conductive tip 21, the resonant circuit portion 23, a ground 25, and a body 27.

The conductive tip 21 may be at least partially formed of a conductive material (e.g., a metal, a conductive rubber, a conductive fabric, a conductive silicon, etc.), and may be electrically connected to the resonant circuit portion 23.

The resonant circuit portion 23, which is an LC resonant circuit, may resonate with a driving signal applied from at least one of the first driving and receiving unit 110 and the second driving and receiving unit 120 to at least one kind of all electrodes among the first touch electrodes 111-1 to 111-*m* and the second touch electrodes 121-1 to 121-*n* through the conductive tip 21.

A resonance signal generated when the resonant circuit portion 23 resonates with the driving signal may be outputted to the touch panel 100 through the conductive tip 21. The driving signal caused by the resonance of the resonant circuit portion 23 may be transferred to the conductive tip 21 during a period in which the driving signal is applied to at least one kind of all electrodes among the first touch electrodes 111-1 to 111-*m* and the second touch electrodes 121-1 to 121-*n* and during a following period. The resonant circuit portion 23 may be disposed in the body 27, and may be electrically connected to the ground 25.

The stylus pen 20 in this manner generates a touch input by generating a resonance signal in response to a driving signal applied to at least one of the touch electrodes 111-1 to 111-*m* and 121-1 to 121-*n*.

Capacitance Cx is generated by at least one of the touch electrodes 111-1 to 111-*m* and 121-1 to 121-*n*, and the conductive tip 21 of the stylus pen 20. The driving signal and the resonance signal may be respectively transferred to the stylus pen 20 and the touch panel 100 through the capacitance Cx generated by at least one of the touch electrodes 111-1 to 111-*m* and 121-1 to 121-*n*, and the conductive tip 21 of the stylus pen 20.

The touch apparatus 10 may detect a touch by a touch object (e.g., a user's body (finger, palm, etc.), or a passive or active stylus pen other than the stylus pen 20 using the above-described method of generating the resonance signal.

For example, the touch apparatus 10 detects a touch by a stylus pen that receives an electrical signal and outputs it as a magnetic field signal. For example, the touch apparatus 10 may further include a digitizer. A touch may be detected by detecting the magnetic field signal that is electromagnetically resonant (or electromagnetically induced) by the stylus pen by the digitizer. Alternatively, the touch apparatus 10 detects a touch by a stylus pen which receives a magnetic field signal and outputs it as a resonant magnetic field signal. For example, the touch apparatus 10 may further include a coil for applying a current as a driving signal, and the digitizer. The stylus pen resonates with a magnetic field signal generated by the coil to which the current is applied. A touch may be detected by detecting the magnetic field signal that is electromagnetically resonant (or electromagnetically induced) by the stylus pen by the digitizer.

The controller 130 may control driving of the touch apparatus 10, and may output touch coordinate information in response to a touch detection result of the touch apparatus 10.

Next, a signal transmission and reception between the touch apparatus 10 and the stylus pen 20 will be described with reference to FIG. 3 and FIG. 4A and FIG. 4B.

Figure 3:
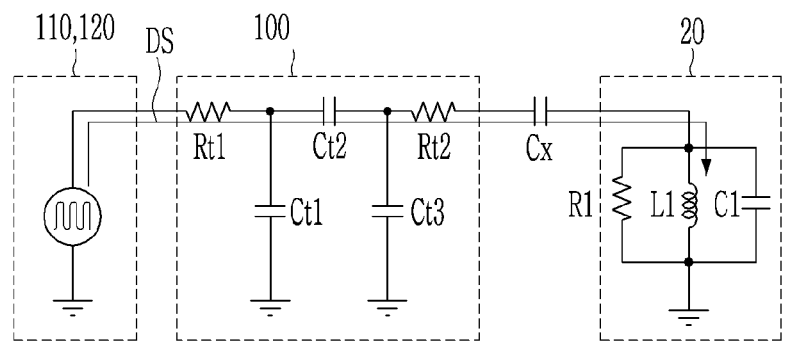
FIG. 3 illustrates an equivalent circuit diagram showing a stylus pen and a touch apparatus that outputs a driving signal.
Figure 4A:
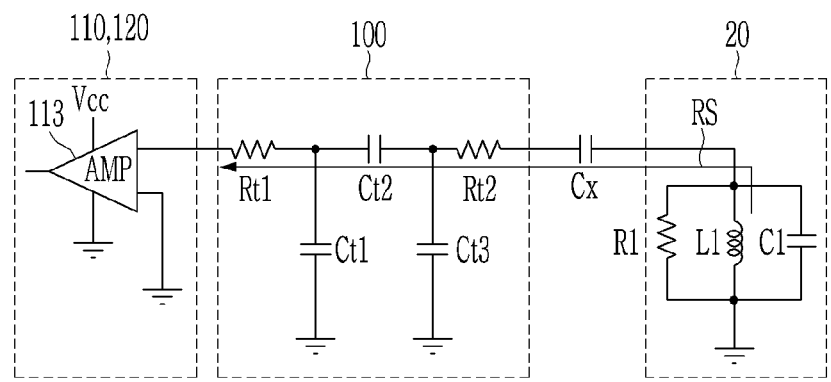
FIG. 4A and FIG. 4B illustrates an equivalent circuit diagram showing a stylus pen and a touch apparatus that receives a detection signal.
Figure 4B:
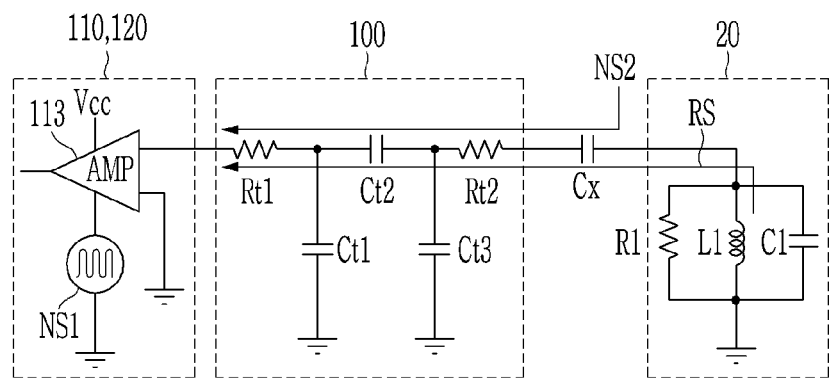

FIG. 3 illustrates an equivalent circuit diagram showing a stylus pen and a touch apparatus that outputs a driving signal, and FIG. 4A and FIG. 4B illustrate an equivalent circuit diagram showing a stylus pen and a touch apparatus that receives a detection signal.

As illustrated in FIG. 3, the stylus pen 20 may be represented by an equivalent circuit including a resistor R1, an inductor L1, and a capacitor C1. At least one of the first driving and receiving unit 110 and the second driving and receiving unit 120 applies a driving signal DS to the touch panel 100. The driving signal DS is transferred to the resonant circuit portion 23 through capacitance Cx generated between the touch panel 100 and the stylus pen 20, i.e., between the touch electrodes 111 and/or 121 and the conductive tip 21. Then, the resonant circuit portion 23 including the inductor L1 and the capacitor C1 of the stylus pen 20 may resonate with the driving signal DS. For resonance, a resonance frequency of the resonant circuit portion 23 and a frequency of the driving signal DS must be the same or very similar.

As illustrated in FIG. 4A, the resonance signal RS of the stylus pen 20 is transferred to at least one of the first driving and receiving unit 110 and the second driving and receiving unit 120 through the capacitance Cx. At least one of the first driving and receiving unit 110 and the second driving and receiving unit 120 include an amplifier 113.

A first voltage $V_{CC}$ is applied to a first power input terminal of the amplifier 113, and a second voltage GND is applied to a second power input terminal. The amplifier 113 may amplify or differentially amplify and output the resonance signal RS inputted into at least one of the two input terminals by using a voltage difference between the first voltage $V_{CC}$ and the second voltage GND.

As illustrated in FIG. 4B, a noise NS1 may be introduced from the outside of the touch panel 100, or a noise NS2 may be introduced from the second power input terminal of the amplifier 113. In this case, the resonance signal RS generated by the driving signal DS has a same or very similar frequency as or to that of the driving signal DS. The noises NS1 and NS2 have a same or similar frequency as or to that of the resonance signal RS.

The noise NS1 is transferred to the input terminal of the amplifier 113 to which the resonance signal RS is transferred or to the input terminal of the amplifier 113 to which the resonance signal RS is not transferred, or may be transferred to both input terminals of the amplifier 113 with different magnitudes, respectively. Accordingly, there is a problem that a signal outputted from the amplifier 113 has noise.

In addition, the noise NS2 is transferred to the second power input terminal to the amplifier 113. Since the amplifier 113 amplifies or differentially amplifies the resonance signal RS by using a voltage difference between a first voltage $V_{CC}$ and the noise NS2, the signal outputted from the amplifier 113 has noise.

As described above, when the noises NS1 and NS2 similar to the driving signal DS (or resonance signal RS) are inputted into the touch apparatus 10, this makes it difficult for the touch apparatus 10 to accurately detect a touch input by the stylus pen 20. In the case of an active stylus pen, when the noises NS1 and NS2 flow into the touch apparatus 10, they are avoided by a frequency hopping method, which changes a frequency of the signal transferred by the active stylus pen, but in the case of a passive stylus pen, a response by the driving signal DS from the touch apparatus 10 is transferred to the touch panel 100 as a detection signal, and thus it was difficult to implement this frequency hopping method.

A stylus pen according to an exemplary embodiment of the present disclosure will be described with reference to FIG. 5 and FIG. 6A and FIG. 6B.

Figure 6A:
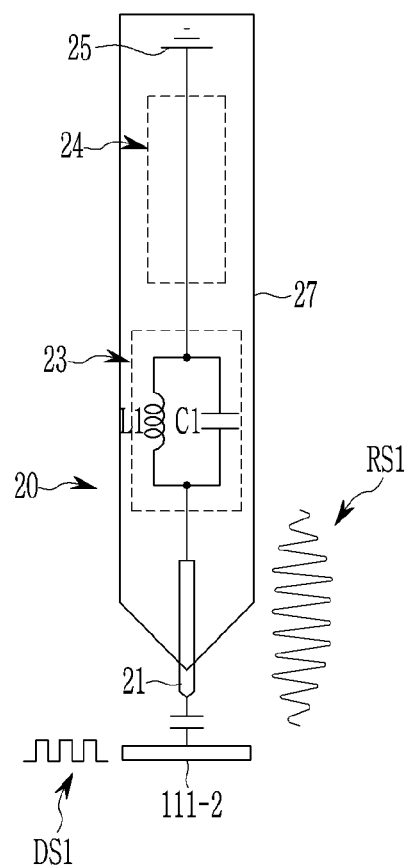
FIG. 6A and FIG. 6B illustrate a schematic view showing a stylus pen including resonant circuits that respectively resonate with driving signals having different frequencies.
Figure 6B:
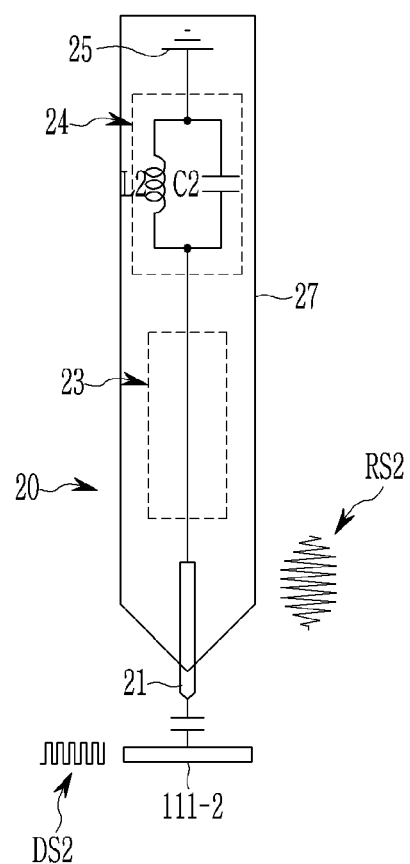

FIG. 5 illustrates a schematic view showing a stylus pen according to an exemplary embodiment, and FIG. 6A and FIG. 6B illustrate a schematic view showing a stylus pen including resonant circuits that respectively resonate with driving signals having different frequencies.

The stylus pen 20 may include a conductive tip 21, a first resonant circuit portion 23, a second resonant circuit portion 24, a ground portion 25, and a body portion 27.

The conductive tip 21 may be at least partially formed of a conductive material (e.g., a metal, a conductive rubber, a conductive fabric, a conductive silicon, etc.), and may be electrically connected to the first resonant circuit portion 23.

Each of the first and second resonant circuit portions 23 and 24 is an LC resonant circuit, and they are connected in series with each other between the conductive tip 21 and the ground portion 25.

Resonance frequencies of the first resonant circuit portion 23 and the second resonant circuit portion 24 are different from each other. The first resonant circuit portion 23 may resonate with a first driving signal transferred through the conductive tip 21, and the second resonant circuit portion 24 may resonate with a second driving signal transferred through the conductive tip 21.

Each of the first resonant circuit portion 23 and the second resonant circuit portion 24 includes an inductor L1 in FIG. 6A (L2 in FIG. 6B) and a capacitor C1 in FIG. 6A (C2 in FIG. 6B).

The inductor L1 includes a first ferrite core and a coil wound on the first ferrite core, and the inductor L2 may include a second ferrite core and a coil wound on the second ferrite core. Herein, the first ferrite core and the second ferrite core are ferrite cores which are separate from each other, and are spaced apart by a predetermined distance or more within the body portion 27. The ferrite cores are easy to deform or bend in a manufacturing process, making it easier to produce ferrite cores of a shorter length. According to the stylus pen 20 of the present exemplary embodiment, a manufacturing cost of the stylus pen 20 may be reduced, and the manufacturing of the stylus pen 20 may be easily performed, by using separate ferrite cores rather than a single ferrite core.

The first driving and receiving unit 110 may apply a first driving signal or a second driving signal to all of the first touch electrodes 111-1 to 111-$m$, and/or the second driving and receiving unit 120 may apply a first driving signal or a second driving signal to all of the second touch electrodes 121-1 to 121-$n$. However, the first first driving and receiving unit 110 may apply the first drive signal to some of the first touch electrodes 111-1 to 111-$m$, and the second first driving and receiving unit 120 may apply the second drive signal to some of the second touch electrodes 121-1 to 121-$n$, but the present invention is not limited thereto.

The stylus pen 20 outputs a resonance signal having a frequency that changes with time in response to an electrical signal having a frequency that changes with time, which is transferred by the first resonant circuit portion 23 and the second resonant circuit portion 24. For example, the electrical signal changes with time from a first driving signal having a first driving frequency to a second driving signal having a second driving frequency that is higher than the first driving frequency, and vice versa, and in response thereto, a frequency of the resonance signal outputted from the stylus pen 20 also changes.

Referring to FIG. 6A, when the first driving signal DS1 is applied to the first touch electrode 111-2, the inductor L1 and the capacitor C1 included in the first resonant circuit portion 23 have very large impedance compared to that of the inductor L2 and the capacitor C2 included in the second resonant circuit portion 24, and a space between the second resonant circuit portion 24 and the ground portion 25 is similar to a short circuit state. When resonance substantially occurs, reactance of LC parallel circuits XL=jwL and XC=1/jwC have same magnitude and opposite signs, and thus infinite impedance is shown by (XL*XC)/(XL+XC), but finite impedance is shown by parasitic resistance and capacitance. As a result of simulation by the inventors, a non-resonant LC parallel circuit was measured to have an average impedance of about 10 ohms as compared with a resonant LC parallel circuit having impedances of around 1 to 2 Mohms. Accordingly, a resonance signal RS1 resonated by the first resonant circuit portion 23 may be outputted.

Referring to FIG. 6B, when the second driving signal DS2 is applied to the first touch electrode 111-2, the inductor L2 and the capacitor C2 included in the first resonant circuit portion 24 have very large impedance compared to that of the inductor L1 and the capacitor C1 included in the first resonant circuit portion 23, and a space between the first resonant circuit portion 23 and the conductive tip 21 is similar to a short circuit state. Accordingly, a resonance signal RS2 resonated by the second resonant circuit portion 24 may be outputted.

The resonance signals RS1 and RS2 may be outputted to the touch panel 100 through the conductive tip 21. The resonance signals RS1 and RS2 may be transferred to the conductive tip 21 during a period in which the driving signal is applied to at least one kind of all electrodes among the first touch electrodes 111-1 to 111-$m$ and the second touch electrodes 121-1 to 121-$n$ and during a following period. The first resonant circuit portion 23 and the second resonant circuit portion 24 are positioned in the body portion 27, and may be electrically connected to the ground portion 25.

The stylus pen 20 in this manner generates a touch input by generating the resonance signals RS1 and RS2 in response to the driving signals DS1 and DS2 applied to at least one of the touch electrodes 111-1 to 111-$m$ and 121-1 to 121-$n$.

Capacitance Cx is generated by at least one of the touch electrodes 111-1 to 111-$m$ and 121-1 to 121-$n$, and the conductive tip 21 of the stylus pen 20. The driving signals DS1 and DS2, and the resonance signals RS1 and RS2 may be respectively transferred to the stylus pen 20 and the touch panel 100 through the capacitance Cx generated by at least one of the touch electrodes 111-1 to 111-$m$ and 121-1 to 121-$n$, and the conductive tip 21 of the stylus pen 20.

Next, an exemplary embodiment of a control method of the touch apparatus 10 using the stylus pen 20 will be described with reference to FIG. 7 and FIG. 8.

Figure 7:
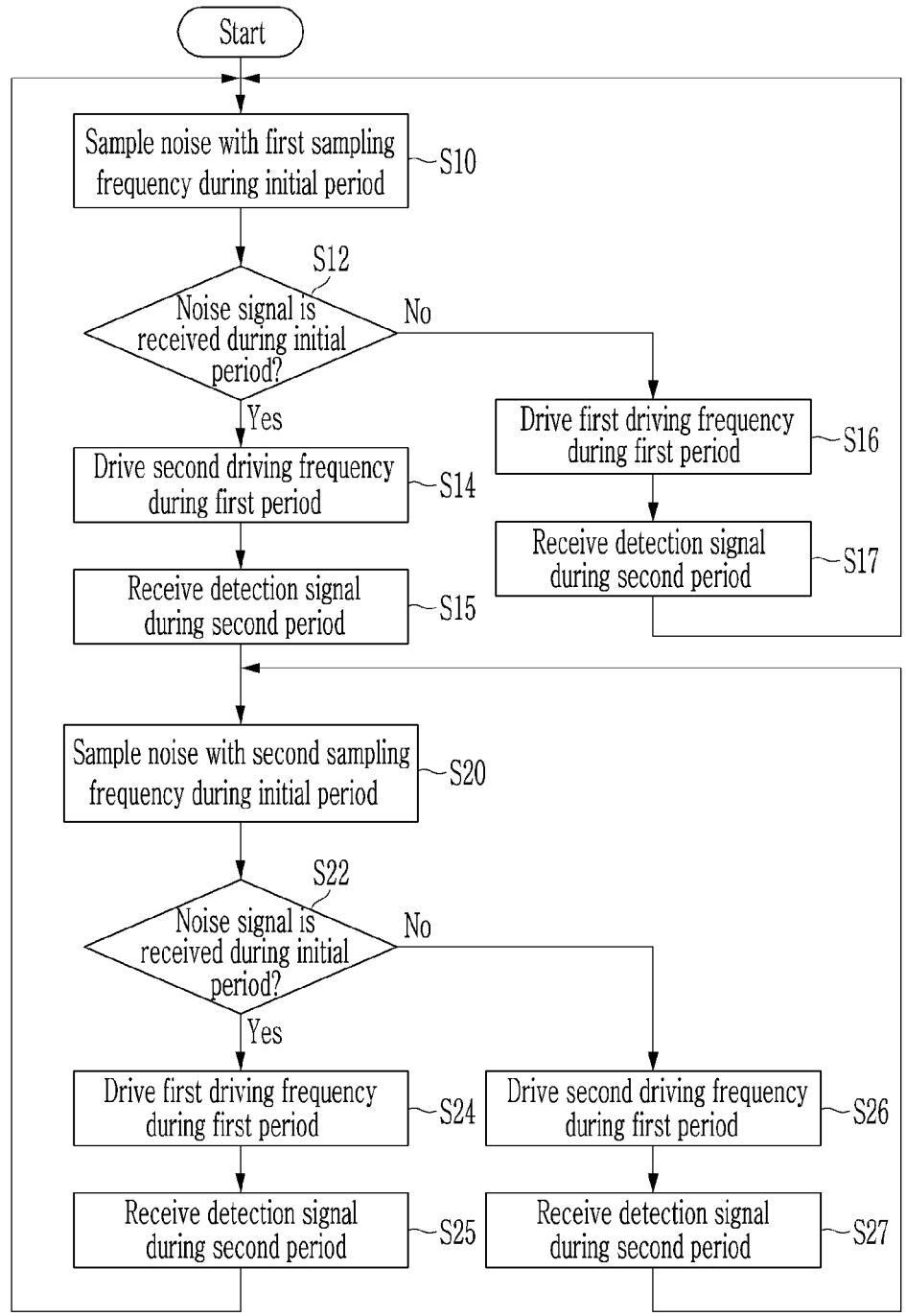
FIG. 7 illustrates a flowchart showing a control method of a touch apparatus according to an exemplary embodiment.
Figure 8:
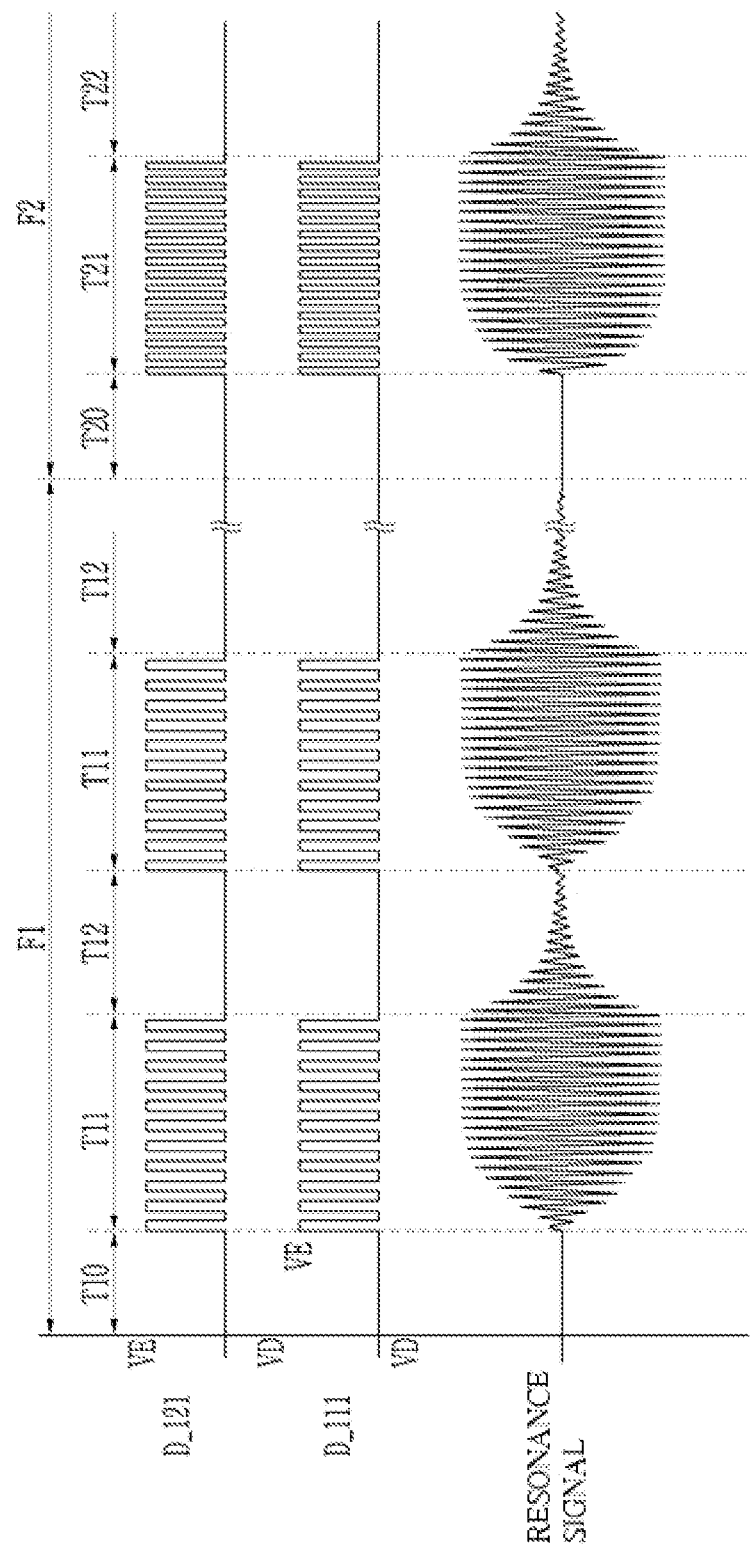
FIG. 8 illustrates a waveform diagram showing an example of a driving signal and a resonance signal according to the control method of the touch apparatus of FIG. 7.

FIG. 7 illustrates a flowchart showing a control method of a touch apparatus according to an exemplary embodiment, and FIG. 8 illustrates a waveform diagram showing an example of a driving signal and a resonance signal according to the control method of the touch apparatus of FIG. 7.

Referring to FIG. 7, the touch apparatus 10 samples a noise with a first sampling frequency during an initial period of one touch report frame period (S10).

In the present exemplary embodiment, one touch report frame period according to a touch report rate may include an initial period, n first periods, and n second periods. The touch report rate indicates a speed or a frequency (Hz) in which the touch apparatus 10 outputs touch data obtained by driving touch electrodes to an external host system for reporting. The first periods and the second periods alternate with each other. That is, a second period exists between two consecutive first periods. After the initial period ends, the first periods start.

In the above, the initial period has been described as the initial period of the touch report frame period, but the initial period described herein may be a period after at least one second period ends. The initial period may be repeated during a period that is smaller than a period for reporting the touch data, or may be repeated during a period that is greater than or equal to the period for reporting the touch data, but the present invention is not limited thereto. For example, the initial period may exist two or more times within one touch report frame period, or may exist once during a plurality of touch report frame periods.

The first driving and receiving unit 110 and the second driving and receiving unit 120 may periodically perform sampling depending on a first sampling frequency.

The sampling frequency has a frequency that is a predetermined multiple of a frequency of any driving signal. In the present disclosure, the first sampling frequency may be a frequency that can be set in relation to a frequency of the first driving signal.

The touch apparatus 10 determines whether a noise is received by using a sampled signal (S12). The touch apparatus 10 may determine whether a noise signal is introduced by using a difference between signals that is periodically sampled depending on the first sampling frequency. For example, the touch apparatus 10 determines that a noise signal is introduced into the touch apparatus 10 when a magnitude difference between signals sampled during the initial period is greater than or equal to a predetermined magnitude.

When it is determined that the noise signal is received during the initial period, the touch apparatus 10 is driven with a second driving frequency during the first periods (S14).

For example, during the first period, the first driving and receiving unit 110 simultaneously applies a second driving signal having the second driving frequency to the first touch electrodes 111-1 to 111-$m$.

Although it has been described above that the first driving and receiving unit 110 simultaneously applies the second driving signal to the first touch electrodes 111-1 to 111-$m$ during the first periods, the second driving and receiving unit 120 may simultaneously apply the second driving signal to the second touch electrodes 121-1 to 121-$n$ during the second periods, or the first driving and receiving unit 110 and the second driving and receiving unit 120 may simultaneously apply the second driving signal to the first touch electrodes 111-1 to 111-$m$ and the second driving signal to the second touch electrodes 121-1 to 121-$n$. When the first driving and receiving unit 110 and the second driving and receiving unit 120 apply the second driving signal to the first touch electrodes 111-1 to 111-$m$ and the second touch electrodes 121-1 to 121-$n$, it is assumed that phases of the second driving signal applied to the first touch electrodes 111-1 to 111-$m$ and the second driving signal applied to the second touch electrodes 121-1 to 121-$n$ are the same, but the present invention is not limited thereto.

In the second period, the touch apparatus 10 receives a detection signal (S15). The touch apparatus 10 may sample the detection signal with the second sampling frequency. For example, the first driving and receiving unit 110 and the second driving and receiving second 120 may periodically perform sampling depending on the second sampling frequency. In the present disclosure, the second sampling frequency may be a frequency that can be set in relation to a frequency of the second driving signal.

The controller 130 may generate touch information indicating touch coordinates, touch strength, and the like by using a detection signal that is periodically sampled depending on the second sampling frequency.

In this case, the controller 130 may obtain a signal magnitude, i.e., an amplitude, of the detection signal by using a difference value between signal values that are sampled at two sampling time points. The controller 130 may determine whether a touch occurs, touch coordinates, etc. depending on the signal magnitude of the detection signal.

When it is determined that the noise signal is not received during the initial period, the touch apparatus 10 is driven with the first driving frequency during the first periods (S16).

For example, during the first period, the first driving and receiving unit 110 simultaneously applies a first driving signal having the first driving frequency to the first touch electrodes 111-1 to 111-*m*.

Although it has been described above that the first driving and receiving unit 110 simultaneously applies the first driving signal to the first touch electrodes 111-1 to 111-*m* during the first periods, the second driving and receiving unit 120 may simultaneously apply the first driving signal to the second touch electrodes 121-1 to 121-*n* during the second periods, or the first driving and receiving unit 110 and the second driving and receiving unit 120 may simultaneously apply the first driving signal to the first touch electrodes 111-1 to 111-*m* and the first driving signal to the second touch electrodes 121-1 to 121-*n*. When the first driving and receiving unit 110 and the second driving and receiving unit 120 apply the first driving signal to the first touch electrodes 111-1 to 111-*m* and the second touch electrodes 121-1 to 121-*n*, it is assumed that phases of the second driving signal applied to the first touch electrodes 111-1 to 111-*m* and the first driving signal applied to the second touch electrodes 121-1 to 121-*n* are the same, but the present invention is not limited thereto.

During the second periods, the touch apparatus 10 receives the detection signal (S17). The touch apparatus 10 may sample the detection signal with the first sampling frequency. For example, the first driving and receiving unit 110 and the second driving and receiving second 120 may periodically perform sampling depending on the first sampling frequency.

Next, the touch apparatus 10 samples noise at the second sampling frequency during the initial period of one touch report frame period (S20). For example, the first driving and receiving unit 110 and the second driving and receiving second 120 may periodically perform sampling depending on the second sampling frequency.

The touch apparatus 10 determines whether a noise is received by using a sampled signal (S22). The touch apparatus 10 may determine whether a noise is introduced by using a difference between signals that are periodically sampled depending on the second sampling frequency. Similarly, the touch apparatus 10 determines that a noise signal is introduced into the touch apparatus 10 when a magnitude difference between signals sampled during the initial period is greater than or equal to a predetermined magnitude.

When it is determined that the noise is received during the initial period, the touch apparatus 10 is driven with the first driving frequency during the first periods (S24).

In the second period, the touch apparatus 10 receives a detection signal (S25). The touch apparatus 10 may sample the detection signal with the first sampling frequency. For example, the first driving and receiving unit 110 and the second driving and receiving unit 120 may periodically perform sampling depending on the first sampling frequency.

When it is determined that no noise is received during the initial period, the touch apparatus 10 is driven with the second driving frequency during the second periods (S26), and receives the detection signal (S27).

Next, a control method of the touch apparatus will be additionally described in detail with reference to FIG. 8.

The first driving and receiving unit 110 and the second driving and receiving second 120 may sample a detection signal in response to a frequency of a first driving signal during an initial period T10 within a touch report frame period F1. In this case, the first driving and receiving unit 110 and the second driving and receiving second 120 apply no driving signal to touch electrodes.

For example, the first driving and receiving unit 110 and the second driving and receiving second 120 may sample the detection signal at at least one sampling time point depending on a clock signal having a predetermined frequency. In this case, the clock signal for sampling the detection signal may have a frequency that is four times the frequency of the first driving signal.

When it is determined that no noise is received during the initial period, the first driving and receiving unit 110 simultaneously applies the first driving signal to the first touch electrodes 111-1 to 111-*m*, and the second driving and receiving second 120 simultaneously applies the first driving signal to the second touch electrodes 121-1 to 121-*n*, during a first period T11 after the initial period T10.

The frequency of the first driving signal applied to the first touch electrodes 111-1 to 111-*m* and the second touch electrodes 121-1 to 121-*n* during the first periods T11 corresponds to a resonance frequency of the first resonant circuit portion 23 of the stylus pen 20.

During a second period T12, the first driving and receiving unit 110 receives detection signals from the first touch electrodes 111-1 to 111-*m*, and the second driving and receiving unit 120 receives detection signals from the second touch electrodes 121-1 to 121-*n*.

The first driving and receiving unit 110 and the second driving and receiving second 120 may sample the detection signal at at least one sampling time point depending on a clock signal having a predetermined frequency. In this case, the clock signal for sampling the detection signal may have a frequency that is four times the frequency of the first driving signal applied during the first period T11.

Even after the first driving signal is ended, the resonance signal outputted by the first resonant circuit portion 23 of the stylus pen 20 during the second period T12 may be received by at least one of the first touch electrodes 111-1 to 111-*m* and the second touch electrodes 121-1 to 121-*n*.

The touch report frame period F1 includes a plurality of first periods T11 and a plurality of second periods T12. For example, within the touch report frame period F1, a combination of the first period T11 and the second period T12 may be repeated eight times.

The first driving and receiving unit 110 and the second driving and receiving second 120 may sample a detection signal in response to a frequency of a first driving signal during an initial period T20 within a touch report frame period F2. In this case, the first driving and receiving unit 110 and the second driving and receiving second 120 apply no driving signal to touch electrodes. The sampling frequency at this time corresponds to the frequency of the driving signal applied during the first period T11 within the touch report frame period F1.

When it is determined that the noise is received during the initial period, the first driving and receiving unit 110 simultaneously applies the second driving signal to the first touch electrodes 111-1 to 111-*m*, and the second driving and receiving second 120 simultaneously applies the second driving signal to the second touch electrodes 121-1 to 121-*n*, during a first period T21 after the initial period T20.

The frequency of the second driving signal applied to the first touch electrodes 111-1 to 111-*m* and the second touch electrodes 121-1 to 121-*n* during the first periods T21 corresponds to a resonance frequency of the second resonant circuit portion 24 of the stylus pen 20

During a second period T22, the first driving and receiving unit 110 receives detection signals from the first touch electrodes 111-1 to 111-*m*, and the second driving and receiving unit 120 receives detection signals from the second touch electrodes 121-1 to 121-*n*.

The first driving and receiving unit 110 and the second driving and receiving second 120 may sample the detection signal at at least one sampling time point depending on a clock signal having a predetermined frequency. In this case, the clock signal for sampling the detection signal may have a frequency that is four times the frequency of the second driving signal applied during the first period T21.

Even after the second driving signal is ended, the resonance signal outputted by the second resonant circuit portion 24 of the stylus pen 20 during the second period T22 may be received by at least one of the first touch electrodes 111-1 to 111-*m* and the second touch electrodes 121-1 to 121-*n*.

The touch report frame period F2 includes a plurality of first periods T21 and a plurality of second periods T22. For example, within the touch report frame period F2, a combination of the first period T21 and the second period T22 may be repeated eight times.

According to the control method of the touch apparatus, the stylus pen 20 may be resonated to receive a signal with reduced noise by applying a driving signal having a different frequency from that of an external noise that is currently applied to the touch apparatus to the touch panel 100.

Next, another exemplary embodiment of a control method of the touch apparatus 10 using the stylus pen 20 will be described with reference to FIG. 9 and FIG. 10.

Figure 9:
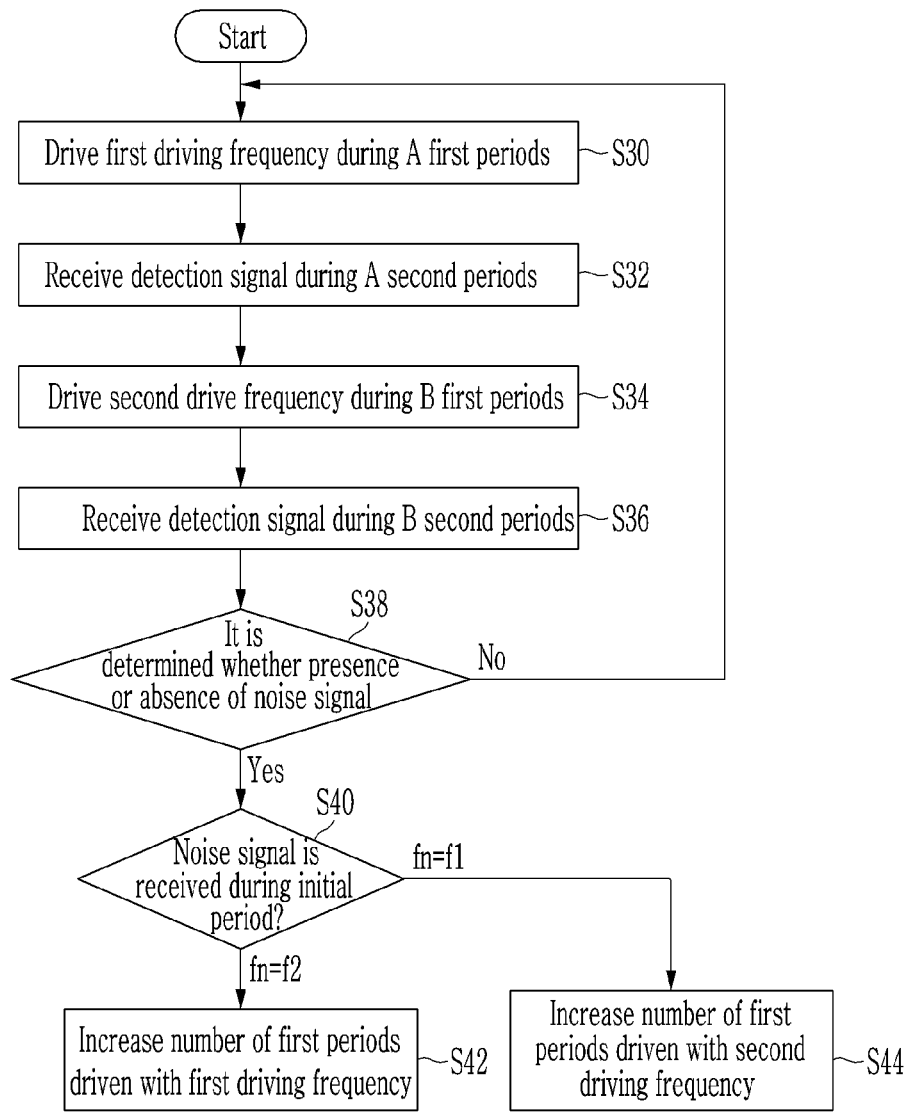
FIG. 9 illustrates a flowchart showing a control method of a touch apparatus according to another exemplary embodiment.
Figure 10:
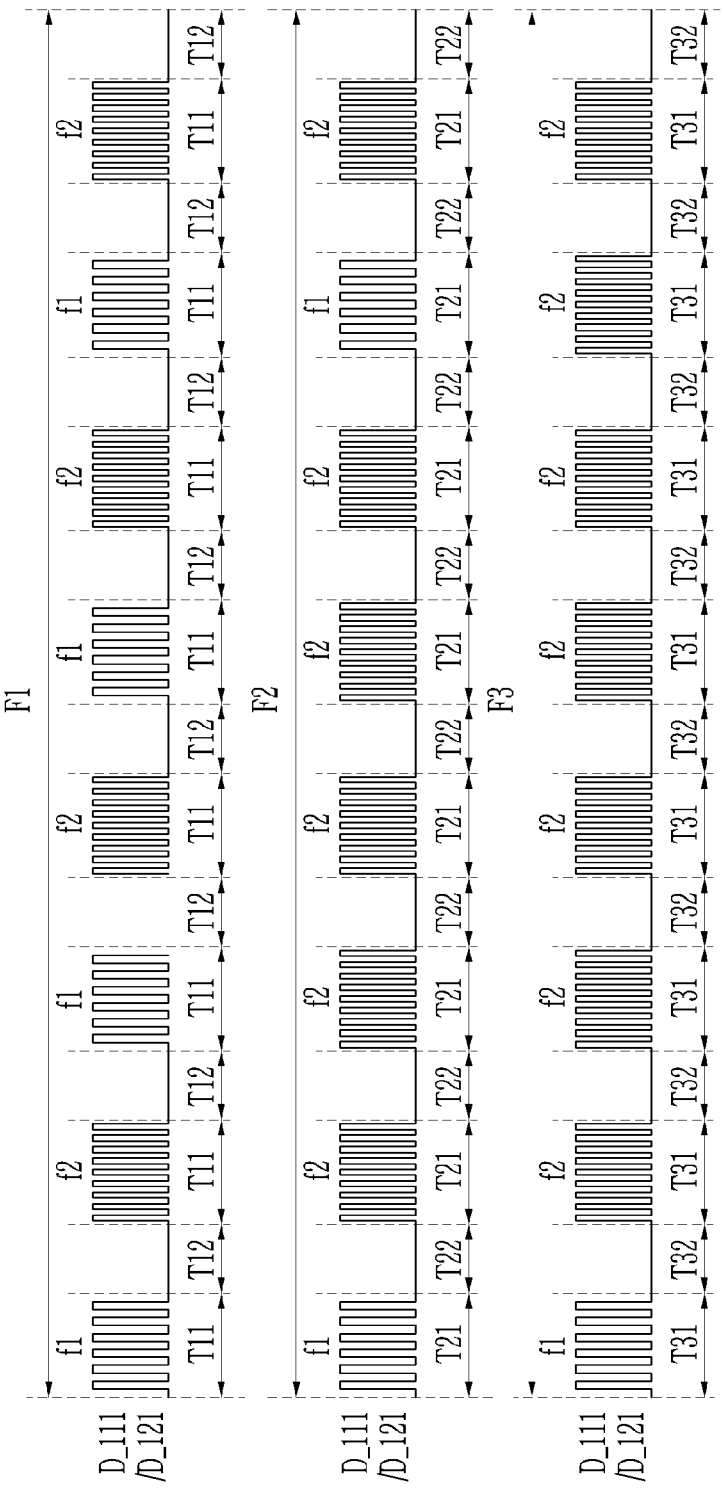
FIG. 10 illustrates a waveform diagram showing an example of a driving signal according to the control method of the touch apparatus of FIG. 9.

FIG. 9 illustrates a flowchart showing a control method of a touch apparatus according to another exemplary embodiment, and FIG. 10 illustrates a waveform diagram showing an example of a driving signal according to the control method of the touch apparatus of FIG. 9.

Referring to FIG. 9, the touch apparatus 10 samples a noise with a first sampling frequency during A first periods of one touch report frame period (S30). Noise sampling is not performed during the initial period compared with the control method of the touch apparatus of FIG. 7.

For example, the first driving and receiving unit 110 simultaneously applies a first driving signal to a plurality of first touch electrodes 111-1 to 111-*m* during A first periods within one touch report frame period.

In the present exemplary embodiment, one touch report frame period according to a touch report rate may include n first periods and n second periods. The first periods and the second periods alternate with each other. That is, a second period exists between two consecutive first periods. The A first periods may include a first period other than one or more first periods (B first periods) among a plurality of first periods included in one touch report frame period. That is, n=A+B (where A>0 and B>0).

In the control method of FIG. 9, a first first-period of one touch report frame period is included in the A first periods. An order and disposal of the A first periods within one touch report frame period may be changed.

Although it has been described above that the first driving and receiving unit 110 simultaneously applies the first driving signal to the of first touch electrodes 111-1 to 111-*m* during the A first periods, the second driving and receiving unit 120 may simultaneously apply the first driving signal to the second touch electrodes 121-1 to 121-*n* during the second periods, or the first driving and receiving unit 110 and the second driving and receiving unit 120 may simultaneously apply the first driving signal to the first touch electrodes 111-1 to 111-*m* and to the second touch electrodes 121-1 to 121-*n*. When the first driving and receiving unit 110 and the second driving and receiving unit 120 apply the first driving signal to the first touch electrodes 111-1 to 111-*m* and the second touch electrodes 121-1 to 121-*n*, it is assumed that phases of the first driving signal applied to the first touch electrodes 111-1 to 111-*m* and the first driving signal applied to the second touch electrodes 121-1 to 121-*n* are the same, but the present invention is not limited thereto.

During A second periods of one touch report frame period, the touch apparatus 10 receives a detection signal (S32). The A second periods include a second period immediately following the A first periods.

For example, the touch apparatus 10 may sample the detection signal with the first sampling frequency. That is, the first driving and receiving unit 110 and the second driving and receiving unit 120 may periodically perform sampling depending on a first sampling frequency.

The controller 130 may generate touch information indicating touch coordinates, touch strength, and the like by using a detection signal that is periodically sampled depending on the first sampling frequency.

In this case, the controller 130 may obtain a signal magnitude, i.e., an amplitude, of the detection signal by using a difference value between signal values that are sampled at two sampling time points. The controller 130 may determine whether a touch occurs, touch coordinates, etc. depending on the signal magnitude of the detection signal.

The touch apparatus 10 samples a noise with a second sampling frequency during B first periods of one touch report frame period (S34).

For example, the first driving and receiving unit 110 simultaneously applies a second driving signal to the first touch electrodes 111-1 to 111-*m* during B first periods within one touch report frame period.

Although it has been described above that the first driving and receiving unit 110 simultaneously applies the second driving signal to the first touch electrodes 111-1 to 111-*m* during the B first periods, the second driving and receiving unit 120 may simultaneously apply the second driving signal to the second touch electrodes 121-1 to 121-*n* during the second periods, or the first driving and receiving unit 110 and the second driving and receiving unit 120 may simultaneously apply the second driving signal to the first touch electrodes 111-1 to 111-*m* and the second driving signal to the second touch electrodes 121-1 to 121-*n*. When the first driving and receiving unit 110 and the second driving and receiving unit 120 apply the second driving signal to the first touch electrodes 111-1 to 111-*m* and the second touch electrodes 121-1 to 121-*n*, it is assumed that phases of the second driving signal applied to the first touch electrodes 111-1 to 111-*m* and the second driving signal applied to the second touch electrodes 121-1 to 121-*n* are the same, but the present invention is not limited thereto.

During B second periods of one touch report frame period, the touch apparatus 10 receives a detection signal (S36). The B second periods include a second period immediately following the B first periods.

For example, the touch apparatus 10 may sample the detection signal with the second sampling frequency. That is, the first driving and receiving unit 110 and the second driving and receiving unit 120 may periodically perform sampling depending on a second sampling frequency.

The controller 130 may generate touch information indicating touch coordinates, touch strength, and the like by using a detection signal that is periodically sampled depending on the second sampling frequency.

In this case, the controller 130 may obtain a signal magnitude, i.e., an amplitude, of the detection signal by using a difference value between signal values that are sampled at two sampling time points. The controller 130 may determine whether touch occurs, touch coordinates, etc. depending on the signal magnitude of the detection signal.

Next, the touch apparatus 10 determines whether there is a noise signal by using the detection signal received during the A second periods and the detection signal received during the B second periods (S38), and when it is determined that there is a noise signal, the controller 130 determines a frequency of the noise signal (S40).

For example, the controller 130 may obtain a signal magnitude (referred to as a first magnitude) of the detection signal by using a difference value between the signal values that are sampled at any two sampling time points during one second period of the A second periods, and may acquire a signal magnitude (referred to as a second magnitude) of the detection signal by using a difference value between the signal values that are sampled at any two sampling time points during one second period of the B second periods.

The controller 130 may determine that there is a noise signal when a difference between the first magnitude and the second magnitude is greater than or equal to a threshold value. When the first magnitude is greater than the second magnitude by a threshold value, the controller 130 may determine that a noise signal having a frequency that is similar to a frequency of the second driving signal is being introduced. Similarly, when the second magnitude is greater than the first magnitude by a threshold value, the controller 130 may determine that a noise signal having a frequency that is similar to a frequency of the first driving signal is being introduced.

In addition, the controller 130 may pre-store a magnitude of a signal that can be detected and outputted from the stylus pen 20 in a memory, etc. by each driving signal, and may determine that a noise signal is flowing thereinto when a signal that is greater than the stored value is received (i.e., the first magnitude is greater than the value stored in memory, or the second magnitude is greater than the value stored in memory).

That is, the controller 130 may determine whether a noise signal having a frequency that is similar to the frequency of the first driving signal or a noise signal having a frequency that is similar to the frequency of the second driving signal is introduced from the outside by comparing a signal received by the touch panel 100 by resonating the first resonant circuit unit 23 by the first driving signal with a signal received by the touch panel 100 by resonating the second resonant circuit unit 24 by the second driving signal.

When the frequency of the noise signal is similar to the frequency of the second drive signal, the touch apparatus 10 increases a number of the first periods during which the touch apparatus 10 is driven by the first driving signal within the touch report frame period (S42).

Then, when the frequency of the noise signal is similar to the frequency of the first drive signal, the touch apparatus 10 increases a number of the first periods during which it is driven by the first driving signal within second touch report frame period (S44).

For example, as illustrated in FIG. 10, when the frequency of the noise signal that is introduced by applying a first driving signal f1 during four first periods T11, and applying a second driving signal f2 during the four first periods T11 within the first touch report frame period F1 is determined to be similar to the frequency of the second driving signal, the controller 130 may apply the first driving signal f1 during six first periods T21 and the second driving signal f2 during two first periods T21 within a second touch report frame period F2. In this case, the controller 130 may generate touch information indicating touch coordinates, touch strength, and the like by using only the detection signal received during six second periods T22.

That is, the controller 130 increases a number of the first periods during which the touch apparatus 10 is driven by the first driving signal when a signal-to-noise ratio (SNR) of a signal that is sampled within A second periods is greater than a SNR of a signal that is sampled within B second periods, and increases a number of the first periods during which the touch apparatus 10 is driven by the second driving signal when a SNR of a signal that is sampled within the B second periods is greater than a SNR of a signal that is sampled within the A second periods.

FIG. 10 illustrates that the first period T11 during which the first driving signal f1 is applied and the second period T12 during which the second driving signal f2 is applied alternate with each other within the first touch report frame period F1, but after the first period T11 during which the first driving signal f1 is applied lasts four times, the second period T12 during which the second driving signal f2 is applied may be started, and an order of the first period T11 during which the first driving signal f1 is applied and the second period T12 during which the second driving signal f2 is applied is not limited in the present exemplary embodiment.

Within the second touch report frame period F2, the controller 130 may perform steps S30 to S40 to determine the presence or absence of a noise signal and to determine the frequency of the noise signal again.

Within the second touch report frame period F2, when a frequency of an introduced noise signal is re-determined to be similar to the frequency of the second driving signal, the controller 130 may apply the first driving signal f1 during seven first periods T31 and the second driving signal f2 during one first period T31 within a third touch report frame period F3.

In this case, the controller 130 may generate touch information indicating touch coordinates, touch strength, and the like by using only the detection signal received during seven second periods T32.

According to the control method of the touch apparatus, the stylus pen 20 may be resonated to receive a signal with reduced noise by determining an external noise that is currently applied to the touch apparatus and applying that of a driving signal having a different frequency from that of the external noise to the touch panel 100.

According to the exemplary embodiments, the touch apparatus 10 may determine the presence or absence of a noise signal, and may transfer touch data including information related to the determined noise signal to the host apparatus.

Touch data will be described with reference to FIG. 11 and FIG. 12.

Figure 11:
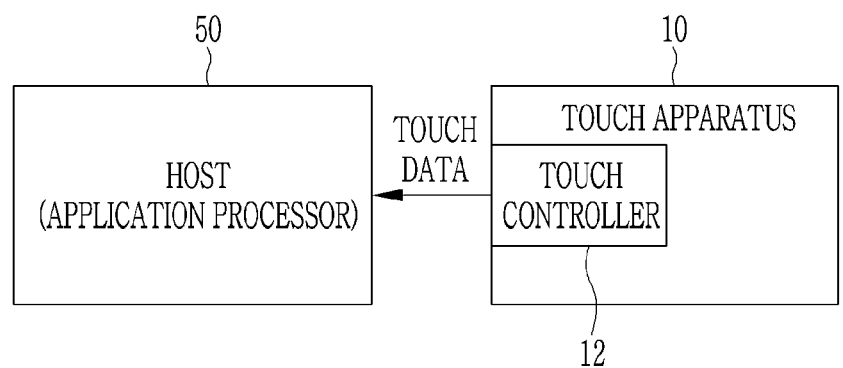
FIG. 11 illustrates a block diagram of a display touch apparatus and a host according to an exemplary embodiment.
Figure 12:
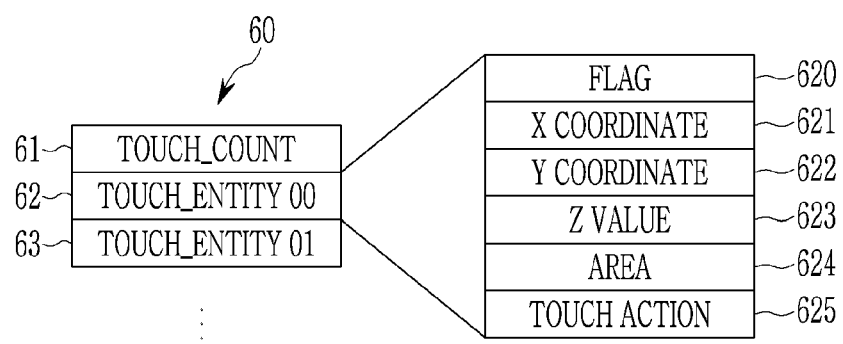
FIG. 12 illustrates an example of touch data provided to a host from a touch apparatus according to an exemplary embodiment.

FIG. 11 illustrates a block diagram of a touch apparatus and a host according to an exemplary embodiment, and FIG. 12 illustrates an example of touch data provided to a host from a touch apparatus.

Referring to FIG. 11, a host 50 may receive touch data from the touch controller 102 included in the touch apparatus 10. For example, the host 50 may be a mobile system-on-chip (SoC), an application processor (AP), a media processor, a microprocessor, a central processing unit (CPU), or a device similar thereto.

After the touch report frame period ends, the touch apparatus 10 may generate information related to a touch input during the touch report frame period as touch data to transfer it to the host 50.

Alternatively, when the second period T12 ends, the touch apparatus 10 may generate information related to the touch input during the second period T12 as touch data to transfer it to the host 50.

Referring to FIG. 12, touch data 60 may include a touch count field 61 and one or more touch entity fields 62 and 63.

In the touch count field 61, a value indicating a number of touches that are inputted during one touch report frame period may be written.

The touch entity fields 62 and 63 include fields indicating information related to each touch input. For example, the touch entity fields 62 and 63 may include a flag field 620, an X-axis coordinate field 621, a Y-axis coordinate field 622, a Z-value field 623, an area field 624, and a touch action field 625.

A number of the touch entity fields 62 and 63 may be equal to a value written in the touch count field 61.

A value representing a touch object may be written in the flag field 620. For example, a finger, a palm, and a stylus pen may be filled in the flag field 620 with different values. Values representing the calculated touch coordinates may be written in the X-axis coordinate field 621 and the Y-axis coordinate field 622. A value corresponding to the signal strength of the detection signal may be written in the Z-value field 623. A value corresponding to an area of the touched area may be written in the area field 624.

According to exemplary embodiments, the host apparatus 50 receiving touch data 60 determines that a touch object is the finger when the touch area is larger than the threshold by using the value of the area field 624, and determines that the touch object is the stylus pen 20 when the touch area is less than or equal to the threshold.

According to the exemplary embodiments, the host apparatus 50 receiving the touch data 60 may identify whether the touch object is the finger or the stylus pen 20 by using the value of the flag field 620.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims

What is claimed is:

1. A stylus pen comprising:
a body portion;
a conductive tip configured to be exposed from an inside of the body portion to an outside thereof; and
a ground portion configured to be electrically connected to a user; and
a resonance circuit portion in the body portion, electrically connected between the conductive tip and the ground portion, and including one or more resonance circuits that resonate with electrical signals of different frequencies transferred from the conductive tip to output resonance signals of different frequencies,
wherein the resonance circuit portion includes:
a first resonance circuit configured to resonate with an electrical signal of a first frequency and includes a first inductor and a first capacitor connected in parallel; and
a second resonance circuit configured to resonate with an electrical signal of a second frequency and includes a second inductor and a second capacitor connected in parallel; and
wherein the first resonance circuit is connected between the conductive tip and the second resonance circuit, and the second resonance circuit is connected between the first resonance circuit and the ground portion, and
wherein the first frequency is lower than the second frequency.

2. The stylus pen of claim 1, wherein
wherein the first resonance circuit outputs the resonance signal through the conductive tip during a first period, and
a second resonance circuit outputs the resonance signal through the conductive tip during a second period that is different from the first period.

3. The stylus pen of claim 2, wherein
the first resonance circuit and the second resonance circuit alternately output the resonance signal.

4. The stylus pen of claim 2, wherein
the first inductor is connected between the conductive tip and the second resonance circuit and the first capacitor is connected between the conductive tip and the second resonance circuit,
the second inductor is connected between the ground portion and the first resonance circuit and the second capacitor is connected between the ground portion and the first resonance circuit, and
the first inductor and the second inductor have ferrite cores separated from each other.

5. The stylus pen of claim 1, wherein
the resonance circuit portion outputs a resonance signal having a frequency that changes with time in response to an electrical signal having a frequency that changes with time.

6. A touch system comprising:
a stylus pen comprising:
a body portion;
a conductive tip configured to be exposed from an inside of the body portion to an outside thereof;
a ground portion configured to be electrically connected to a user; and
a resonance circuit portion in the body portion, electrically connected between the conductive tip and the ground portion, and including one or more resonance circuits that resonate with electrical signals of different frequencies transferred from the conductive tip to output resonance signals of different frequencies,
wherein the resonance circuit portion includes:
a first resonance circuit configured to resonate with an electrical signal of a first frequency and includes a first inductor and a first capacitor connected in parallel; and
a second resonance circuit configured to resonate with an electrical signal of a second frequency and includes a second inductor and a second capacitor connected in parallel;
wherein the first resonance circuit is connected between the conductive tip and the second resonance circuit, and the second resonance circuit is connected between the first resonance circuit and the ground portion, and
wherein the first frequency is lower than the second frequency;
a touch apparatus comprising:
a touch sensor configured to include first touch electrodes sensing a touch input in a first direction and second touch electrodes sensing a touch input in a second direction crossing the first direction; and
a controller configured to determine whether a noise signal is received by sampling a signal transferred from at least one of the first touch electrodes and the second touch electrodes depending on a first sampling frequency associated with a first driving frequency during a first period within a touch report frame period, and when it is determined that the noise signal is received, to apply a second driving signal having a second driving frequency that is different from the first driving frequency to at least one of the first touch electrodes and the second touch electrodes during a second period after the first period.

7. The touch system of claim 6, wherein
the controller receives a detection signal by sampling a signal transferred from at least one of the first touch electrodes and the second touch electrodes depending on a second sampling frequency associated with the second driving signal during a third period after the second period.

8. The touch system of claim 7, wherein
the signal transferred from at least one of the first touch electrodes and the second touch electrodes during the third period is a signal resonated by the second driving signal.

9. The touch system of claim 7, wherein
the controller determines whether a noise signal is received by sampling the signal transmitted from at least one of the first touch electrodes and the second touch electrodes depending on a second sampling frequency associated with the second driving frequency during a first period within a next touch report frame period after the third period ends.

10. The touch system of claim 6, wherein
the controller applies a first driving signal having the first driving frequency to at least one of the first touch electrodes and the second touch electrodes during a second period after the first period when it is determined that the noise signal is not received.

11. The touch system of claim 10, wherein
the controller receives a detection signal by sampling a signal transferred from at least one of the first touch electrodes and the second touch electrodes depending on the first sampling frequency during a third period after the second period.

12. A touch system comprising:
a stylus pen comprising:
 a body portion;
 a conductive tip configured to be exposed from an inside of the body portion to an outside thereof;
 a ground portion configured to be electrically connected to a user; and
 a resonance circuit portion in the body portion, electrically connected between the conductive tip and the ground portion, and including one or more resonance circuits that resonate with electrical signals of different frequencies transferred from the conductive tip to output resonance signals of different frequencies,
 wherein the resonance circuit portion includes:
  a first resonance circuit configured to resonate with an electrical signal of a first frequency and includes a first inductor and a first capacitor connected in parallel; and
  a second resonance circuit configured to resonate with an electrical signal of a second frequency and includes a second inductor and a second capacitor connected in parallel;
  wherein the first resonance circuit is connected between the conductive tip and the second resonance circuit, and the second resonance circuit is connected between the first resonance circuit and the ground portion, and
  wherein the first frequency is lower than the second frequency;
a touch apparatus comprising:
 a touch sensor configured to include first touch electrodes sensing a touch input in a first direction and second touch electrodes sensing a touch input in a second direction crossing the first direction; and
 a controller configured to, within one touch report frame period including a plurality of first periods, receive a first detection signal during a first number of first periods by applying a first driving signal having a first driving frequency to at least one of the first touch electrodes and the second touch electrodes and sampling a signal transferred from at least one of the first touch electrodes and the second touch electrodes depending on a first sampling frequency associated with the first driving frequency, and receive a second detection signal during a second number of first periods by applying a second driving signal having a second driving frequency different from the first driving frequency to at least one of the first touch electrodes and the second touch electrodes and sampling a signal transferred from at least one of the first touch electrodes and the second touch electrodes depending on a second sampling frequency associated with the second driving frequency.

13. The touch system of claim 12, wherein
the controller determines whether a noise signal is received by using the first detection signal and the second detection signal, and when it is determined that the noise signal is received, changes a first number and a second number within a next touch report frame period.

14. The touch system of claim 13, wherein
the controller increases the first number when a signal-to-noise ratio (SNR) of the first detection signal is greater than a SNR of the second detection signal, and increases the second number when a SNR of the second detection signal is greater than a SNR of the first detection signal.

15. The touch system of claim 12, wherein
the first number and the second number are the same.

* * * * *